US006827356B2

United States Patent
Zhuang

(10) Patent No.: US 6,827,356 B2
(45) Date of Patent: Dec. 7, 2004

(54) REAR CARRYING BOARD ASSEMBLY OF A STROLLER

(76) Inventor: Yu-Lin Zhuang, 58, Ma Yuan West St., Taichung (TW)

( * ) Notice: Subject to any disclaimer, the term of this patent is extended or adjusted under 35 U.S.C. 154(b) by 127 days.

(21) Appl. No.: 10/377,519

(22) Filed: Feb. 26, 2003

(65) Prior Publication Data

US 2004/0164510 A1 Aug. 26, 2004

(51) Int. Cl.⁷ .................................................. B62B 9/00
(52) U.S. Cl. ..................... 280/32.7; 280/304.1; 280/656
(58) Field of Search .............................. 280/32.7, 204, 280/656, 647, 650, 642, 63, 79.11, 47.38, 304.1

(56) References Cited

U.S. PATENT DOCUMENTS

| | | | | |
|---|---|---|---|---|
| 3,834,726 A | * | 9/1974 | Hobza | 280/87.041 |
| 4,828,282 A | * | 5/1989 | Pinto | 280/32.7 |
| 5,829,770 A | * | 11/1998 | Chiu | 280/204 |
| 5,979,921 A | * | 11/1999 | Derven et al. | 280/204 |
| 6,056,306 A | * | 5/2000 | Rust et al. | 280/204 |
| 6,145,855 A | * | 11/2000 | Bellis, Jr. | 280/32.7 |
| 6,193,252 B1 | * | 2/2001 | Lin | 280/204 |
| 6,234,495 B1 | * | 5/2001 | Velke | 280/32.7 |
| 6,371,498 B2 | * | 4/2002 | Lundh | 280/47.38 |
| 6,422,634 B2 | * | 7/2002 | Lundh | 296/97.21 |
| 6,540,238 B2 | * | 4/2003 | Yang | 280/32.7 |
| 2001/0033069 A1 | * | 10/2001 | Ivers | 280/648 |
| 2003/0025304 A1 | * | 2/2003 | Haeggberg | 280/656 |

* cited by examiner

Primary Examiner—Christopher P. Ellis
Assistant Examiner—Jeff Restifo

(57) ABSTRACT

A rear carrying board assembly of a stroller includes a body, two joint devices, two connecting devices, and two shock-absorbing devices. Thus, the rear carrying board assembly is mounted on the rear portion of the stroller for supporting the baby or for placing an article, thereby enhancing the versatility of the stroller.

18 Claims, 13 Drawing Sheets

REAR CARRYING BOARD ASSEMBLY OF A STROLLER

BACKGROUND OF THE INVENTION

1. Field of the Invention

The present invention relates to a rear carrying board assembly of a stroller, and more particularly to a rear carrying board assembly of a stroller, wherein the rear carrying board assembly is mounted on the rear portion of the stroller for supporting the baby or for placing an article, thereby enhancing the versatility of the stroller.

2. Description of the Related Art

A conventional stroller comprises a rear carrying board which is mounted on the rear portion of the stroller for supporting the baby or placing an article. However, the conventional rear carrying board is assembled in a loose manner, so that it is easily detached from the stroller during a long-term utilization.

SUMMARY OF THE INVENTION

The primary objective of the present invention is to provide a rear carrying board assembly of a stroller, wherein the rear carrying board assembly is mounted on the rear portion of the stroller for supporting the baby or for placing an article, thereby enhancing the versatility of the stroller.

Another objective of the present invention is to provide a rear carrying board assembly of a stroller, wherein the rear carrying board assembly can be assembled actually and precisely.

A further objective of the present invention is to provide a rear carrying board assembly of a stroller, wherein the rear carrying board assembly can be assembled rigidly and stably.

In accordance with the present invention, there is provided a rear carrying board assembly of a stroller, comprising a body, two joint devices, two connecting devices, and two shock-absorbing devices, wherein:

the body has a bottom having a first side having two ends each formed with a chamber, the chamber is formed with a slide channel, a plurality of pivot ears each located at a first side of the slide channel and each formed with a through hole, and a through bore located at a second side of the slide channel, the slide channel has a side wall formed with a rectangular hole, the chamber has a side wall formed with a circular hole aligning with the through hole of each of the pivot ears, the body includes two clamping blocks each pivotally mounted in the respective chamber and each having a first side formed with a plurality of pivot ears and a second side formed with a through hole, two threaded rods each extended through the through bore of the respective chamber and the through hole of the respective clamping block, two rotation knobs each screwed on the respective threaded rod and each rested on the respective clamping block, and two elastic members each mounted on the respective threaded rod and each urged between the respective chamber and the respective clamping block;

each of the two joint devices is mounted on the body, and includes a shaft, a cover, a washer, two press blocks, and a straddle bar;

the shaft is extended through the rectangular hole and is slidably mounted in the slide channel of the respective chamber, the shaft has a distal end provided with a circular hollow hub which has a center provided with an inner threaded rod and a periphery formed with a plurality of engaging teeth;

the cover is mounted on the hub of the shaft, the cover has a periphery formed with two opposite windows and provided with a hollow receiving portion;

each of the two press blocks is movably mounted in the respective window of the cover, and is provided with an arcuate block which has a first side formed with a locking tooth meshing with the engaging teeth of the hub of the shaft, and a second side having two ends each formed with a mounting hole for mounting an elastic member which is urged between the two press blocks;

the straddle bar has a first end inserted into the receiving portion of the cover and a second end formed with an action section;

each of the two connecting devices is mounted on the straddle bar of the respective joint device, and includes a connecting block, a movable clamping plate, a mounting ring, and a slide;

the connecting block has a first portion formed with an arcuate fixed clamping plate which has a first end formed with an opening and a second end formed with an extension formed with a through hole, the opening has a top wall and a bottom wall each formed with a through hole, the connecting block has a mediate portion formed with a groove for insertion of the action section of the straddle bar of the respective joint device, the connecting block has a second portion formed with a receiving chamber which has two side walls each formed with a pivot hole and a top wall formed with a cutout;

the movable clamping plate is pivotally mounted on the fixed clamping plate of the connecting block, and has a first end received in the opening of the connecting block and formed with a through hole aligning with the through hole of the opening of the connecting block, and a second end formed with an extension formed with a through hole;

the mounting ring is mounted between the movable clamping plate and the fixed clamping plate;

the slide is slidably mounted in the receiving chamber of the connecting block, the slide has an end formed with an extension plate, and has a top formed with a movable portion movably mounted in the cutout of the receiving chamber of the connecting block and an enlarged push portion located above the movable portion and movably mounted on the connecting block;

each of the two shock-absorbing devices is mounted on the bottom of the body, and includes a column, a wheel, an elastic member, and a protective sleeve.

Further benefits and advantages of the present invention will become apparent after a careful reading of the detailed description with appropriate reference to the accompanying drawings.

DETAILED DESCRIPTION OF THE INVENTION

Figure 1:
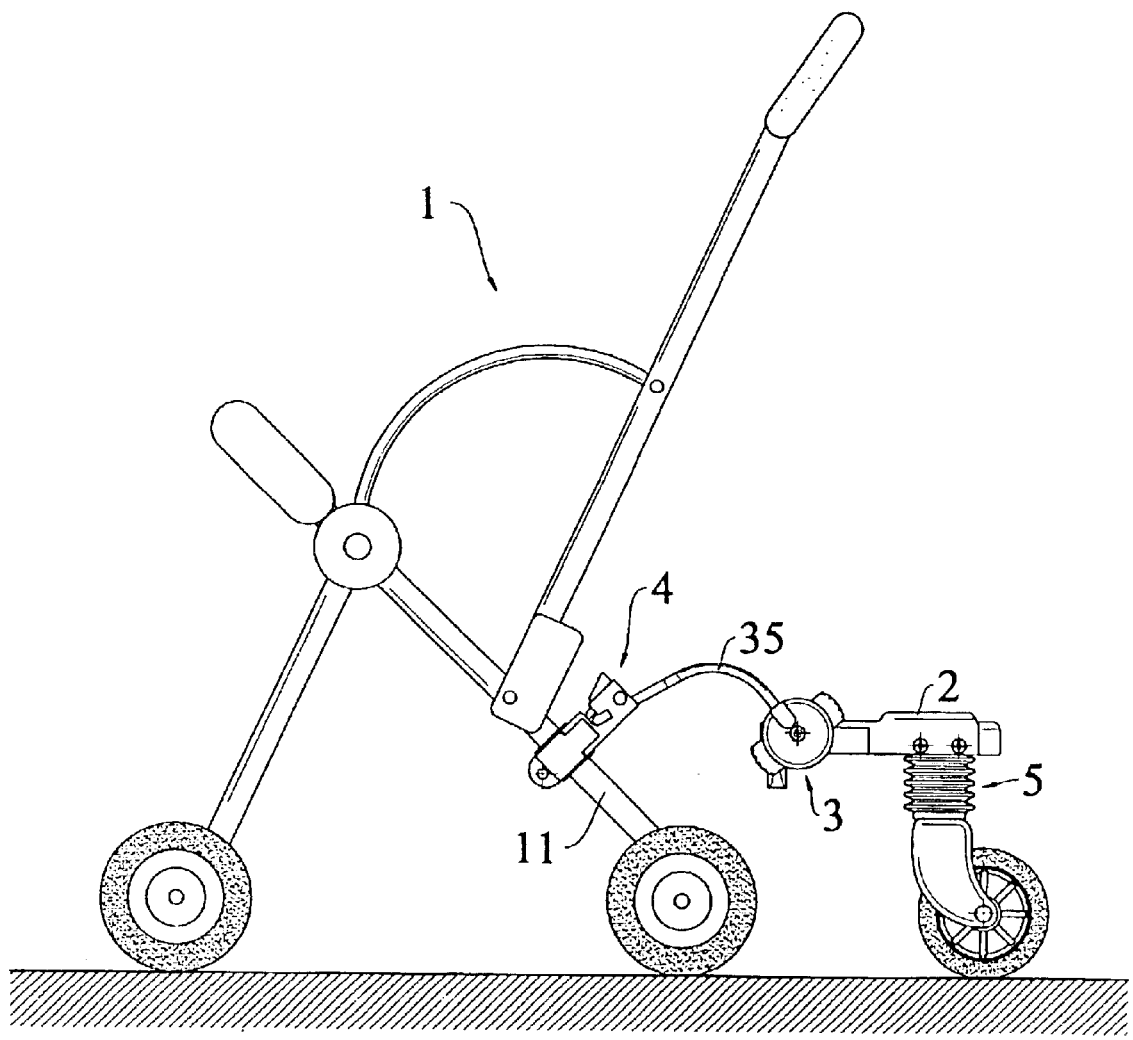
FIG. 1 is a side plan view of a rear carrying board assembly of a stroller in accordance with the preferred embodiment of the present invention.
Figure 2:
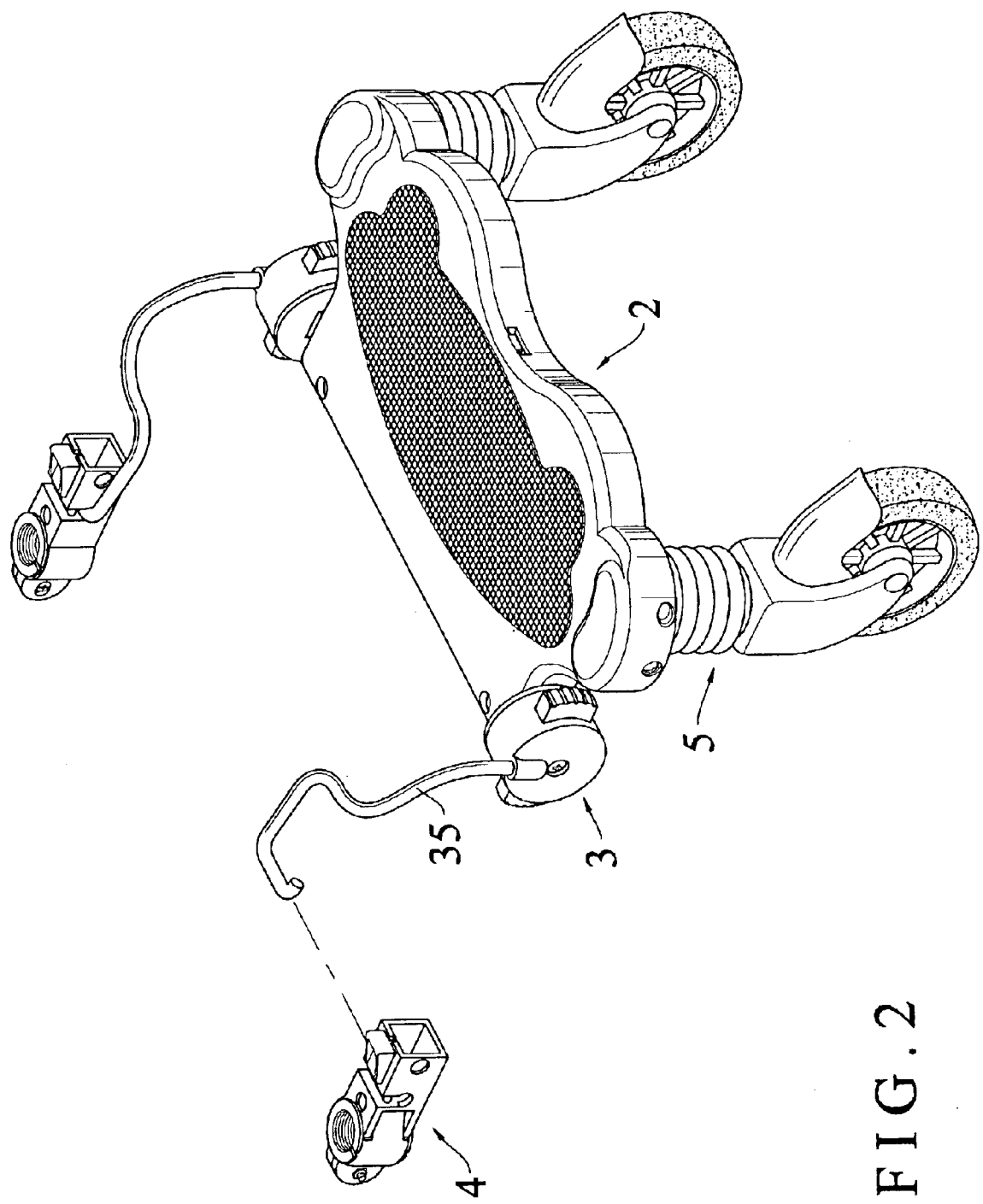
FIG. 2 is a perspective assembly view of the rear carrying board assembly of a stroller in accordance with the preferred embodiment of the present invention.
Figure 3:
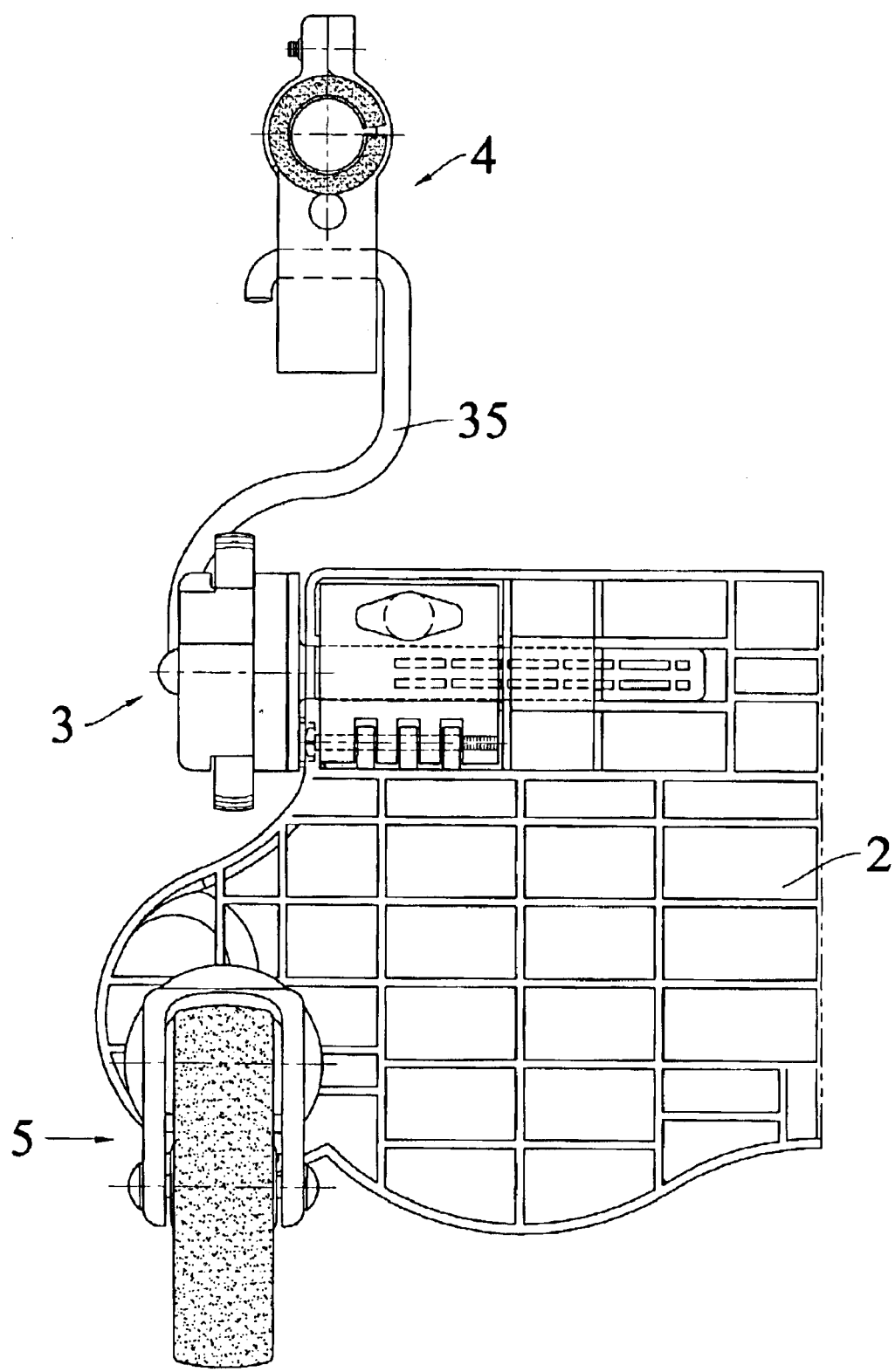
FIG. 3 is a partially plan assembly view of the rear carrying board assembly of a stroller in accordance with the preferred embodiment of the present invention.

Referring to the drawings and initially to FIGS. 1-3, a rear carrying board assembly of a stroller 1 in accordance with the preferred embodiment of the present invention comprises a body 2, two joint devices 3, two connecting devices 4, and two shock-absorbing devices 5. The rear carrying board assembly is mounted on the rear portion of the stroller 1 for supporting the baby or for placing an article.

Figure 4:
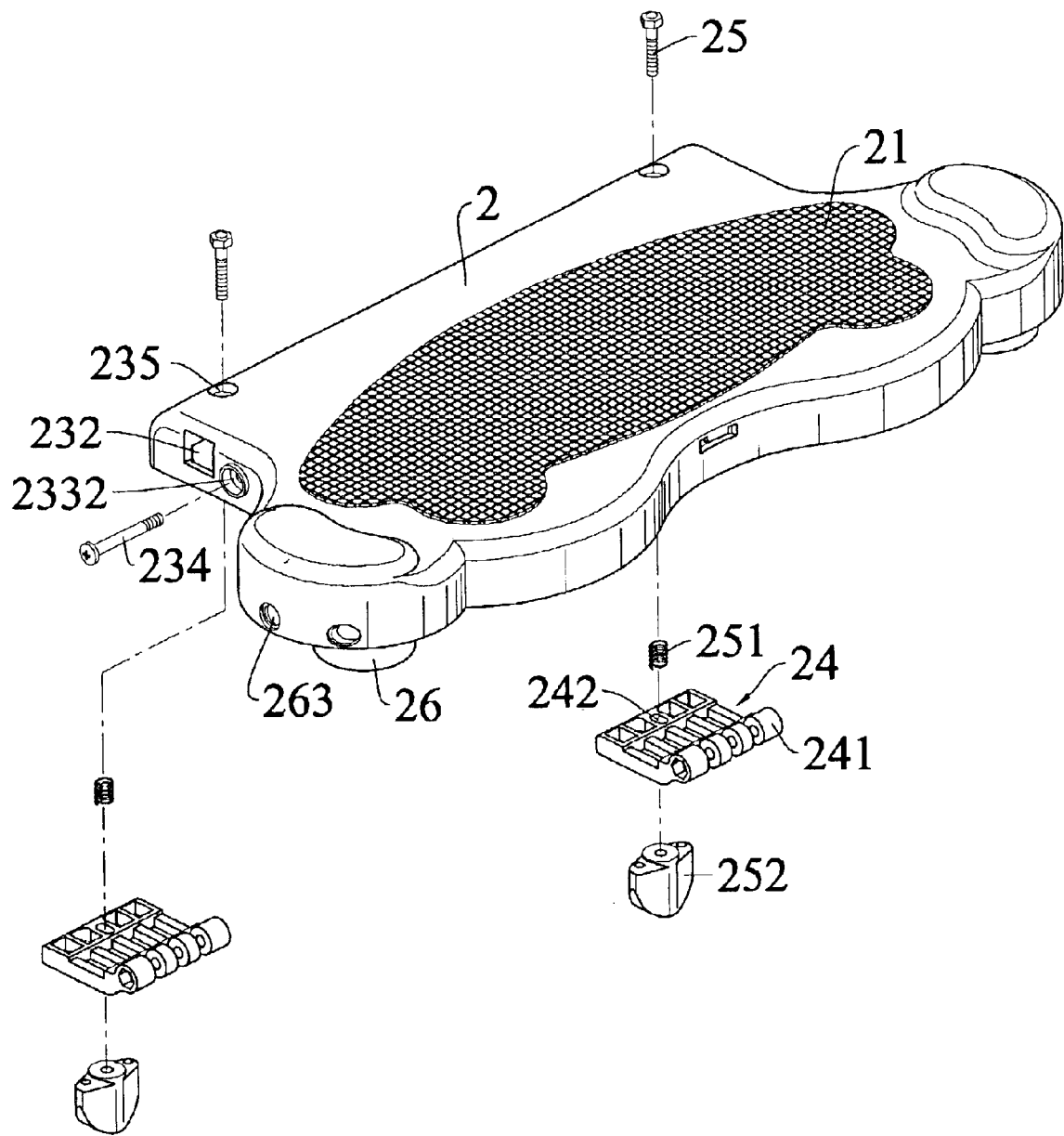
FIG. 4 is an exploded perspective view of the body of the rear carrying board assembly of a stroller in accordance with the preferred embodiment of the present invention.
Figure 5:
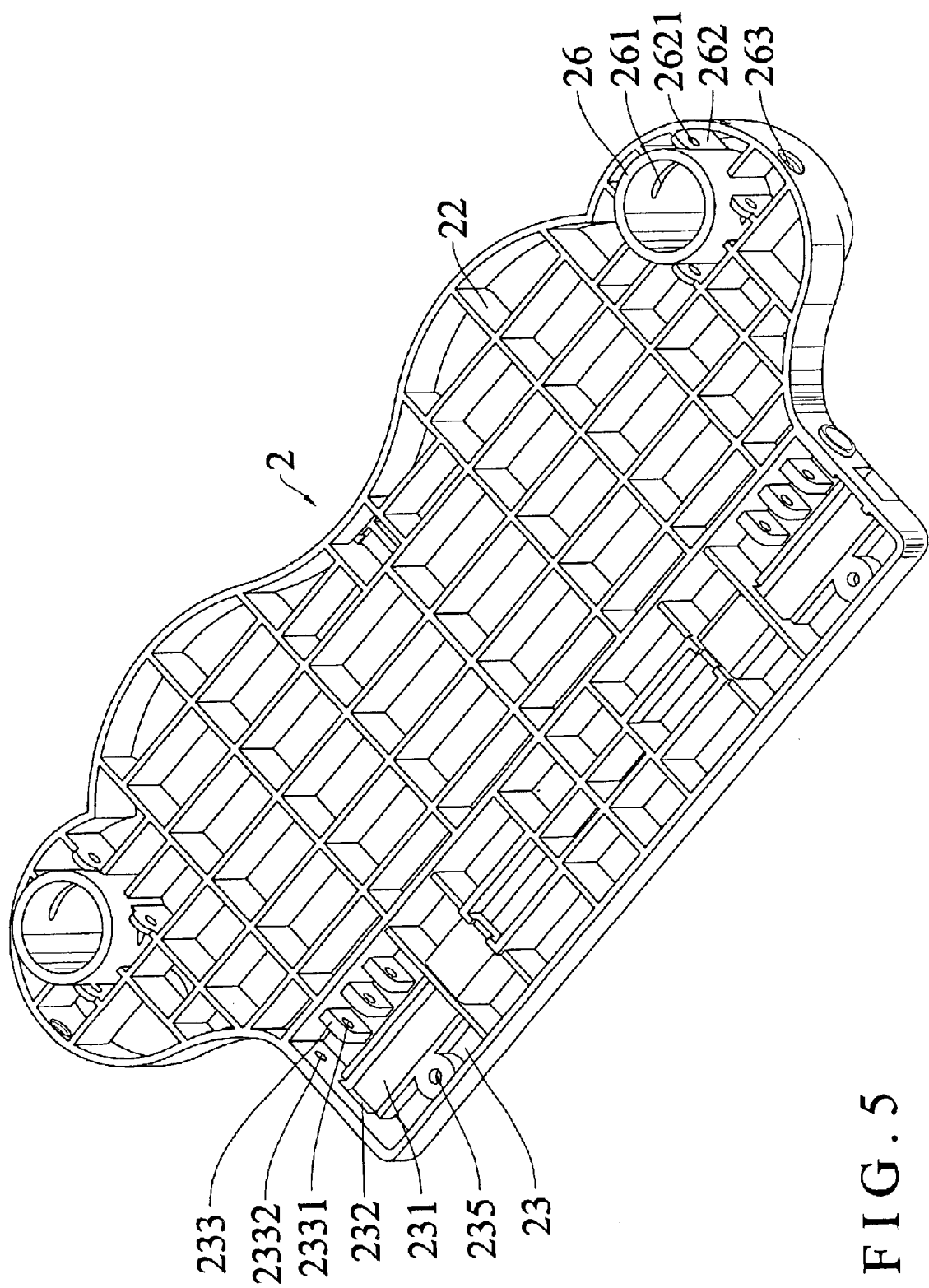
FIG. 5 is a bottom perspective view of the body of the rear carrying board assembly of a stroller in accordance with the preferred embodiment of the present invention.

Referring to FIGS. 4 and 5, the body 2 is a flat board having a top formed with an anti-skid portion 21 and a bottom formed with a plurality of reinforcing ribs 22. The bottom of the body 2 has a first side having two ends each formed with a chamber 23. The chamber 23 is formed with a slide channel 231, a plurality of pivot ears 233 each located at a first side of the slide channel 231 and each formed with a through hole 2331, and a through bore 235 located at a second side of the slide channel 231. The slide channel 231 has a side wall formed with a rectangular hole 232. The chamber 23 has a side wall formed with a circular hole 2332 aligning with the through hole 2331 of each of the pivot ears 233.

The body 2 includes two clamping blocks 24 each pivotally mounted in the respective chamber 23 and each having a first side formed with a plurality of pivot ears 241 and a second side formed with a through hole 242, two pivot rods 234 each extended through the circular hole 2332 of a respective chamber 23, each of the pivot ears 241 of a respective clamping block 24 and the through hole 2331 of each of the pivot ears 233 of the respective chamber 23, two threaded rods 25 each extended through the through bore 235 of the respective chamber 23 and the through hole 242 of the respective clamping block 24, two rotation knobs 252 each screwed on the respective threaded rod 25 and each rested on the respective clamping block 24, and two elastic members 251 each mounted on the respective threaded rod 25 and each urged between the respective chamber 23 and the respective clamping block 24.

The bottom of the body 2 has a second side having two ends each formed with a socket 26 formed with two opposite arcuate slots 261. The socket 26 has a periphery provided with two pairs of protruding ears 262 each formed with a through hole 2621. The bottom of the body 2 has a side wall formed with two circular holes 263 aligning with the through hole 2621 of the respective protruding ears 262.

Figure 6:
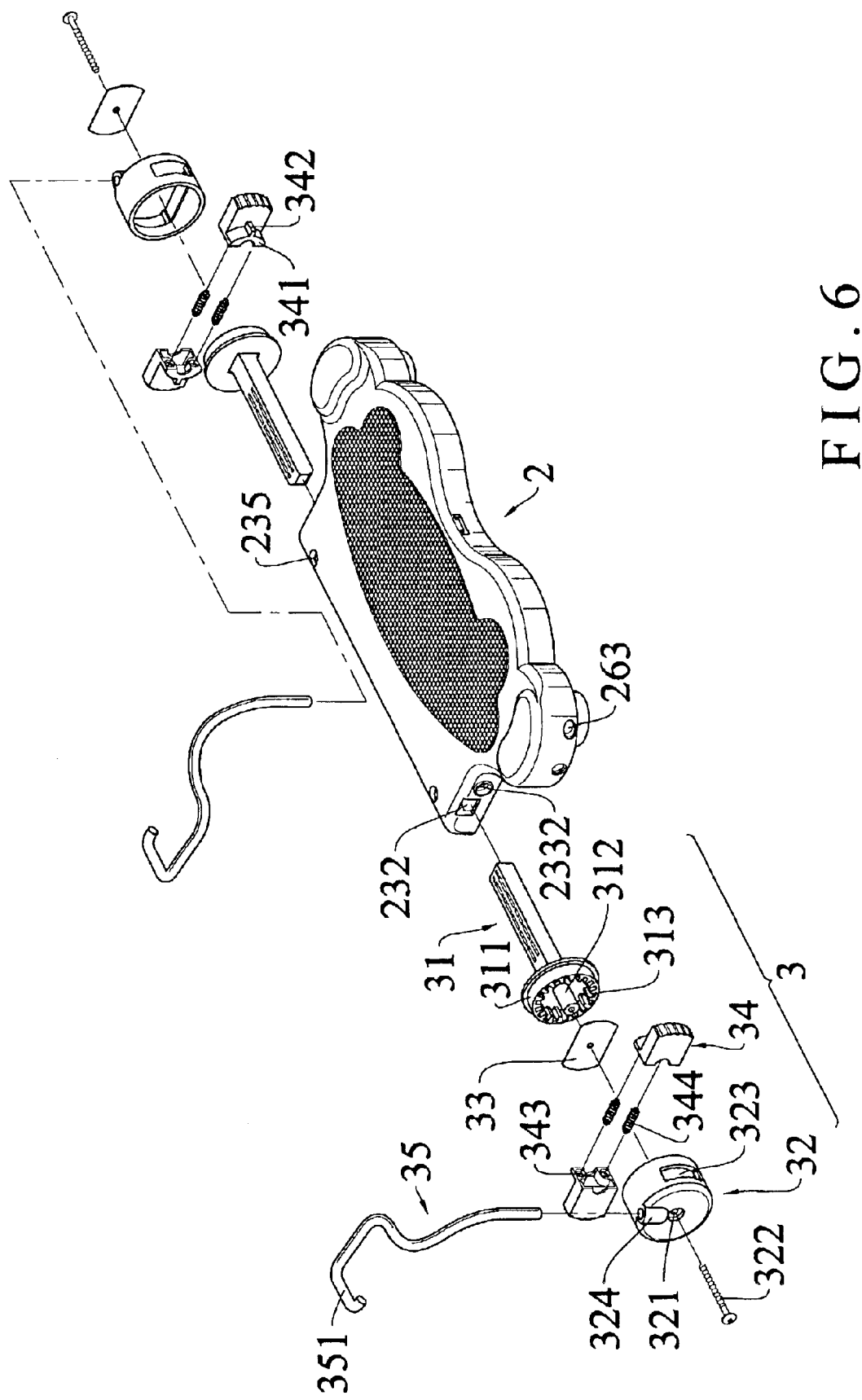
FIG. 6 is an exploded perspective view of the joint device of the rear carrying board assembly of a stroller in accordance with the preferred embodiment of the present invention.

Referring to FIG. 6, each of the two joint devices 3 is mounted on the body 2, and includes a shaft 31, a cover 32, a washer 33, two press blocks 34, and a straddle bar 35.

The shaft 31 is extended through the rectangular hole 232 and is slidably mounted in the slide channel 231 of the respective chamber 23. The shaft 31 has a distal end provided with a circular hollow hub 311 which has a center provided with an inner threaded rod 312 and a periphery formed with a plurality of engaging teeth 313.

The cover 32 is mounted on the hub 311 of the shaft 31, and has a center formed with a central hole 321 for passage of a threaded rod 322 which is extended through the washer 33 and is screwed into the inner threaded rod 312, thereby securing the cover 32 on the hub 311 of the shaft 31. The cover 32 has a periphery formed with two opposite windows 323 and provided with a hollow receiving portion 324.

Each of the two press blocks 34 is movably mounted in the respective window 323 of the cover 32, and is provided with an arcuate block 341 which has a first side formed with a locking tooth 342 meshing with the engaging teeth 313 of the hub 311 of the shaft 31, and a second side having two ends each formed with a mounting hole 343 for mounting an elastic member 344 which is urged between the two press blocks 34.

The straddle bar 35 has a first end inserted into the receiving portion 324 of the cover 32 and a second end formed with an action section 351.

Figure 7:
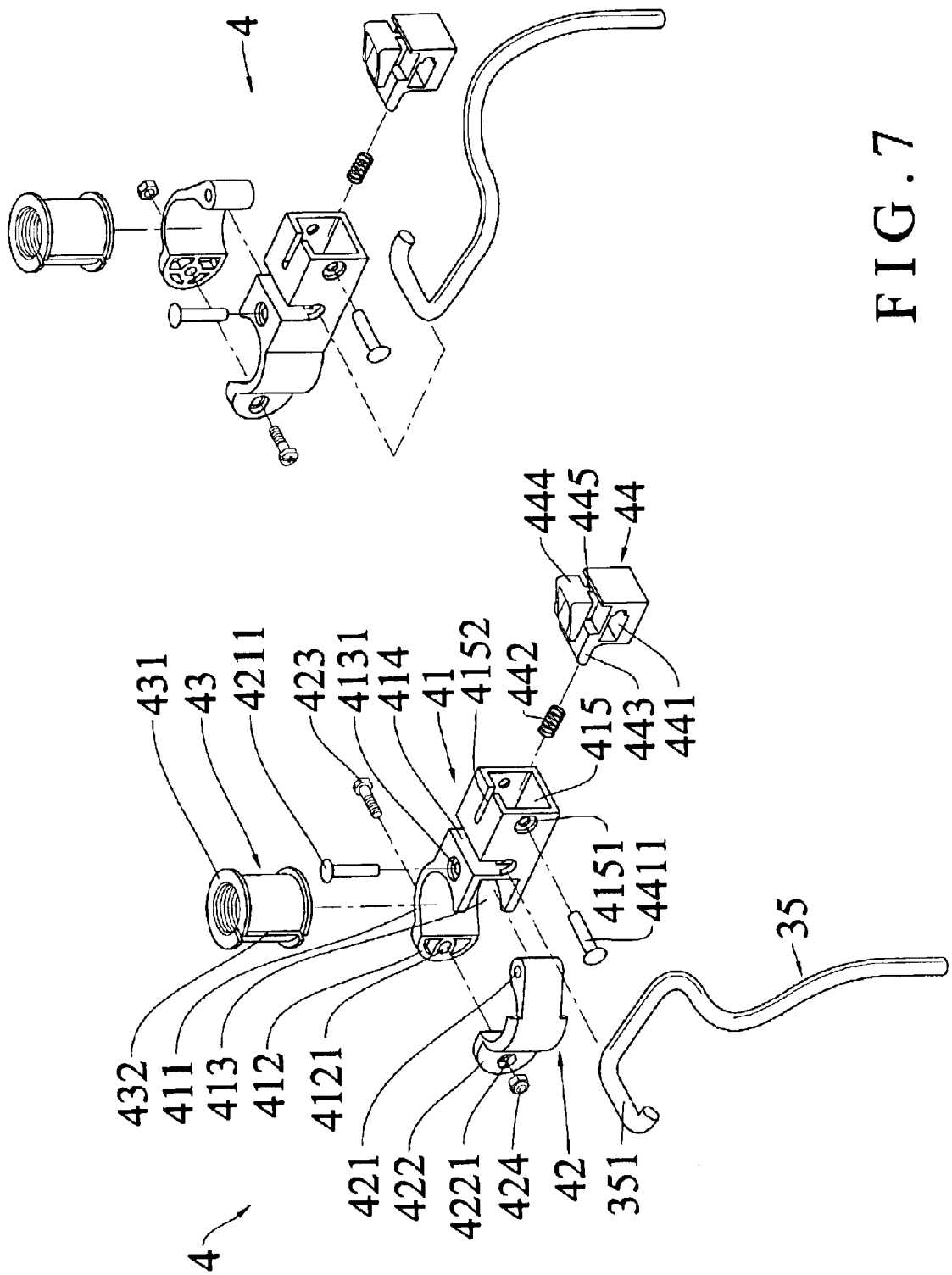
FIG. 7 is an exploded perspective view of the connecting device of the rear carrying board assembly of a stroller in accordance with the preferred embodiment of the present invention.

Referring to FIG. 7, each of the two connecting devices 4 is mounted on the straddle bar 35 of the respective joint device 3, and includes a connecting block 41, a movable clamping plate 42, a mounting ring 43, and a slide 44.

The connecting block 41 has a first portion formed with an arcuate fixed clamping plate 411 which has a first end formed with an opening 413 and a second end formed with an extension 412 formed with a through hole 4121. The opening 413 has a top wall and a bottom wall each formed with a through hole 4131. The connecting block 41 has a mediate portion formed with a groove 414 for insertion of the action section 351 of the straddle bar 35 of the respective joint device 3. The connecting block 41 has a second portion formed with a receiving chamber 415 which has two side walls each formed with a pivot hole 4151 and a top wall formed with a cutout 4152. The receiving chamber 415 communicates with the groove 414.

The movable clamping plate 42 having an arcuate shape is pivotally mounted on the fixed clamping plate 411 of the connecting block 41, and has a first end received in the opening 413 of the connecting block 41 and formed with a through hole 421 aligning with the through hole 4131 of the opening 413 of the connecting block 41. A pivot rod 4211 is extended through the through hole 4131 of the opening 413 of the connecting block 41 and the through hole 421 of the movable clamping plate 42. The movable clamping plate 42 has a second end formed with an extension 422 formed with a through hole 4221. A threaded rod 423 is extended through the through hole 4121 of the extension 412 of the fixed clamping plate 411 and the through hole 4221 of the extension 422 of the movable clamping plate 42, and is screwed with a nut 424, thereby securing the movable clamping plate 42 on the fixed clamping plate 411.

The mounting ring 43 having a flexible feature is mounted between the movable clamping plate 42 and the fixed clamping plate 411. The mounting ring 43 has a wall formed with a slit 432 and has two ends each formed with an annular lip 431.

Figure 8:
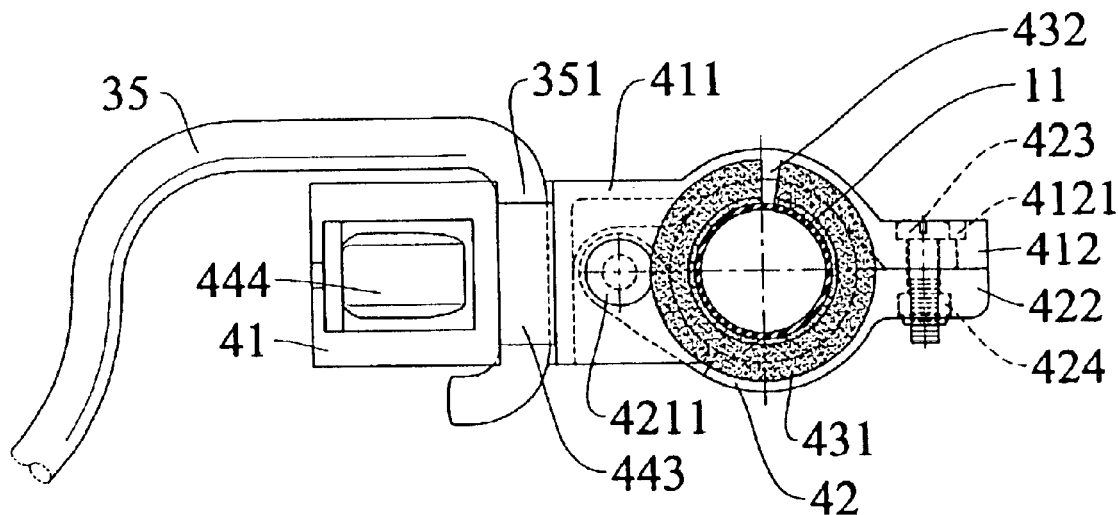
FIG. 8 is a plan cross-sectional assembly view of the connecting device of the rear carrying board assembly of a stroller in accordance with the preferred embodiment of the present invention.
Figure 8A:
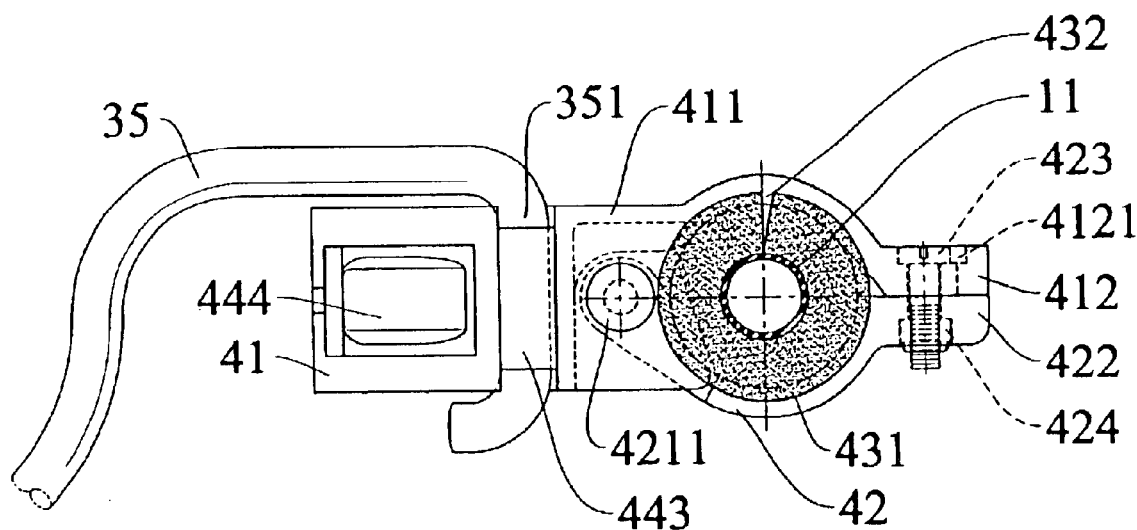
FIG. 8A is a plan cross-sectional assembly view of the connecting device of the rear carrying board assembly of a stroller in accordance with another embodiment of the present invention.

As shown in FIGS. 8 and 8A, the mounting ring 43 has a different inner diameter to fit and clamp the diameter of the rear frame 11 of the stroller 1.

The slide 44 is slidably mounted in the receiving chamber 415 of the connecting block 41, and has a side formed with an oblong guide slot 441. A guide rod 4411 is extended through the pivot hole 4151 of the receiving chamber 415 of the connecting block 41 and the guide slot 441 of the slide 44, so that the slide 44 is movably mounted on the guide rod 4411. An elastic member 442 is mounted in the guide slot 441 of the slide 44 and is urged between the guide rod 4411 and a front wall of the guide slot 441 of the slide 44. The slide 44 has an end formed with an extension plate 443, and has a top formed with a reduced movable portion 445 movably mounted in the cutout 4152 of the receiving chamber 415 of the connecting block 41 and an enlarged push portion 444 located above the movable portion 445 and movably mounted on the connecting block 41.

Figure 9:
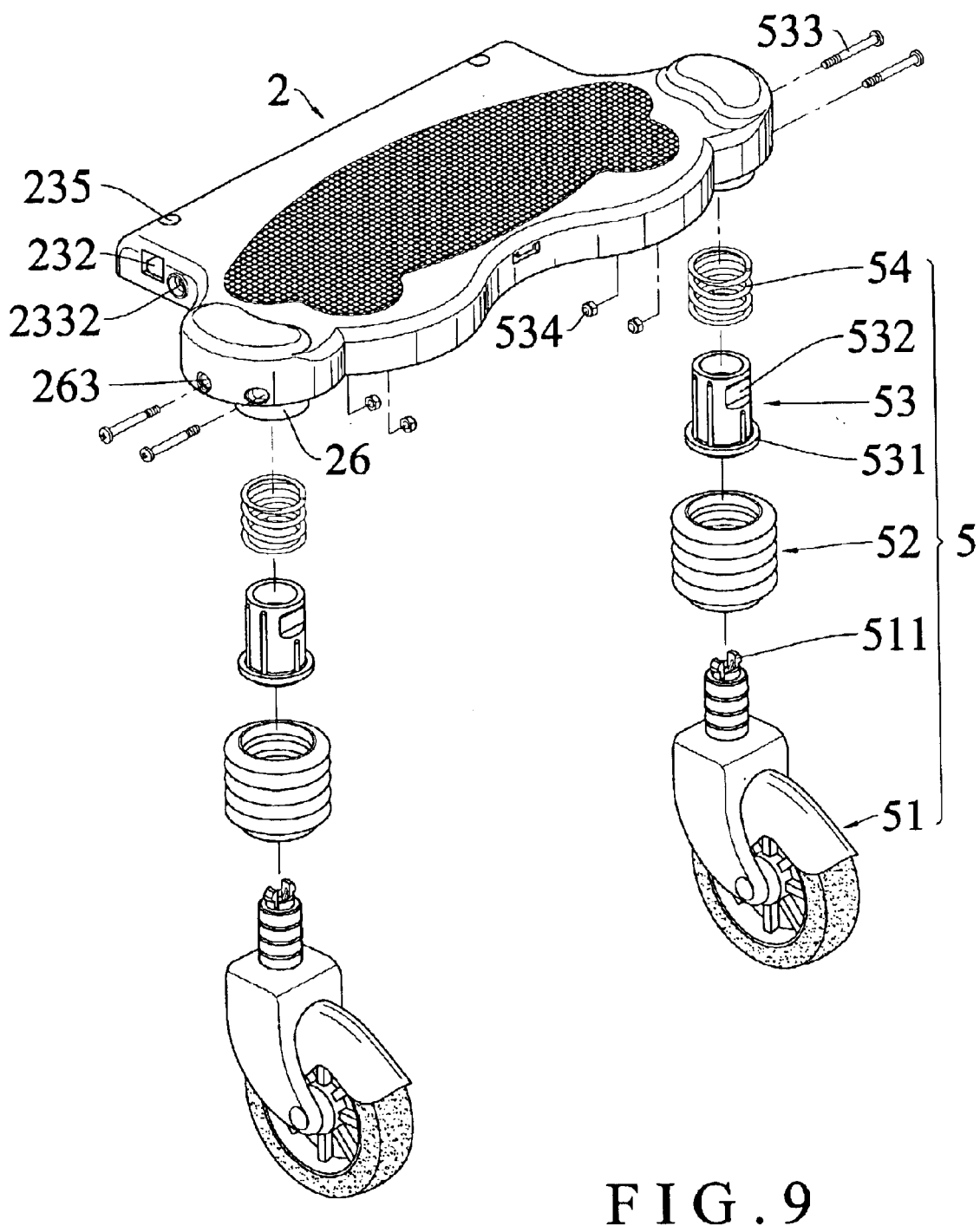
FIG. 9 is an exploded perspective view of the shock-absorbing device of the rear carrying board assembly of a stroller in accordance with the preferred embodiment of the present invention.
Figure 10:
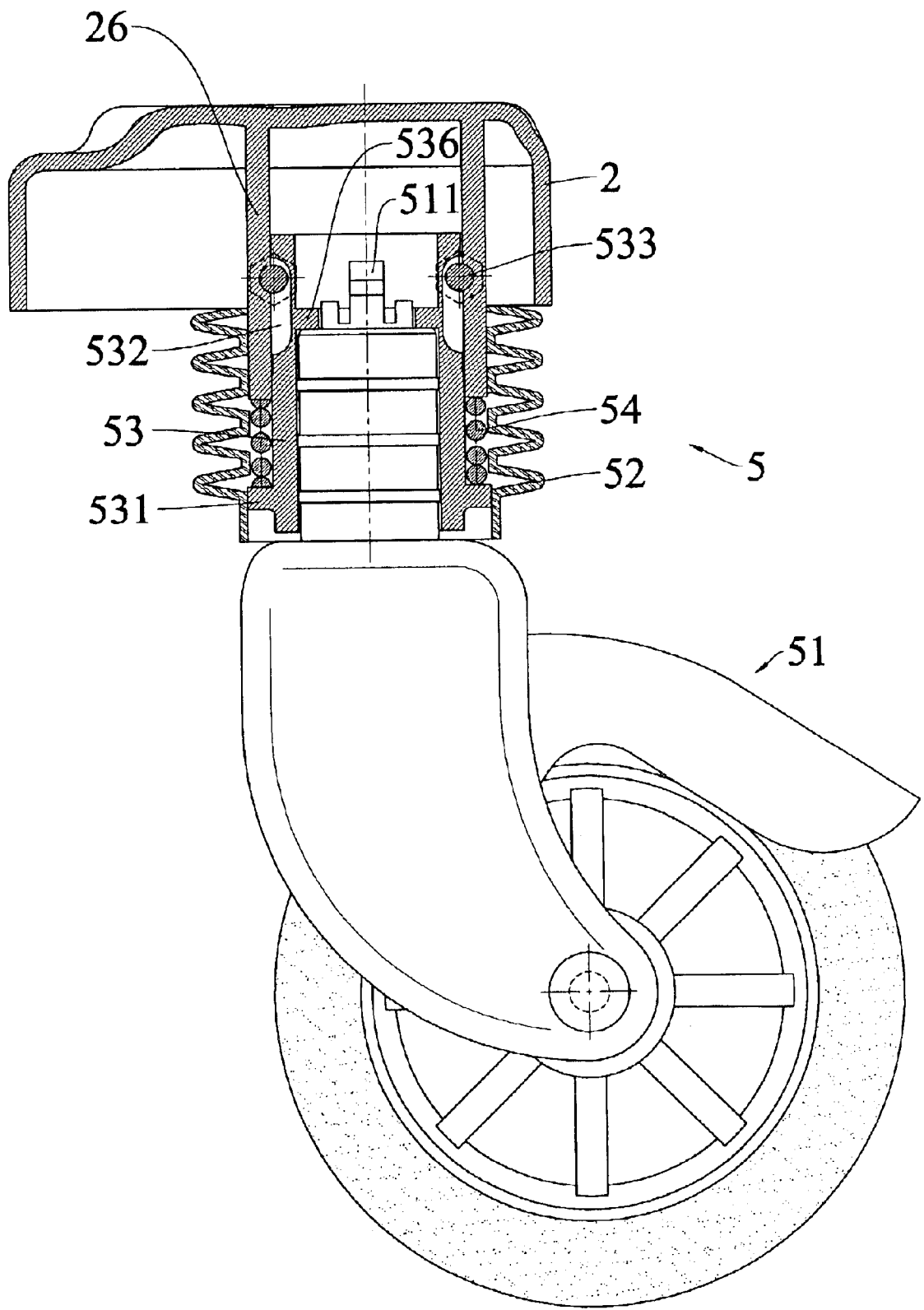
FIG. 10 is a side plan cross-sectional assembly view of the shock-absorbing device of the rear carrying board assembly of a stroller as shown in FIG. 9.

Referring to FIGS. 9 and 10, each of the two shock-absorbing devices 5 is mounted on the bottom of the body 2, and includes a column 53, a wheel 51, an elastic member 54, and a protective sleeve 52.

The column 53 is movably mounted in the respective socket 26 of the body 2, and has an upper portion formed with two slide grooves 532 and a lower portion formed with an annular resting flange 531. The column 53 has an inner wall formed with an inner ring 536. Each of the two shock-absorbing devices 5 further includes two locking bolts 533 each extended through the respective circular hole 263 of the body 2, the through hole 2621 of the respective protruding ears 262, the respective arcuate slot 261 of the socket 26 and the respective slide groove 532 of the column 53, and two locking nuts 534 each screwed on the respective locking bolt 533.

The wheel 51 has a top rotatably mounted on the column 53 and provided with two elastic hooks 511 hooked on the inner ring 536 of the column 53.

The elastic member 54 is mounted on the column 53 and urged between a bottom of the socket 26 and the resting flange 531 of the column 53.

The protective sleeve 52 is mounted on the socket 26 to encompass the column 53 and the elastic member 54.

Figure 11:
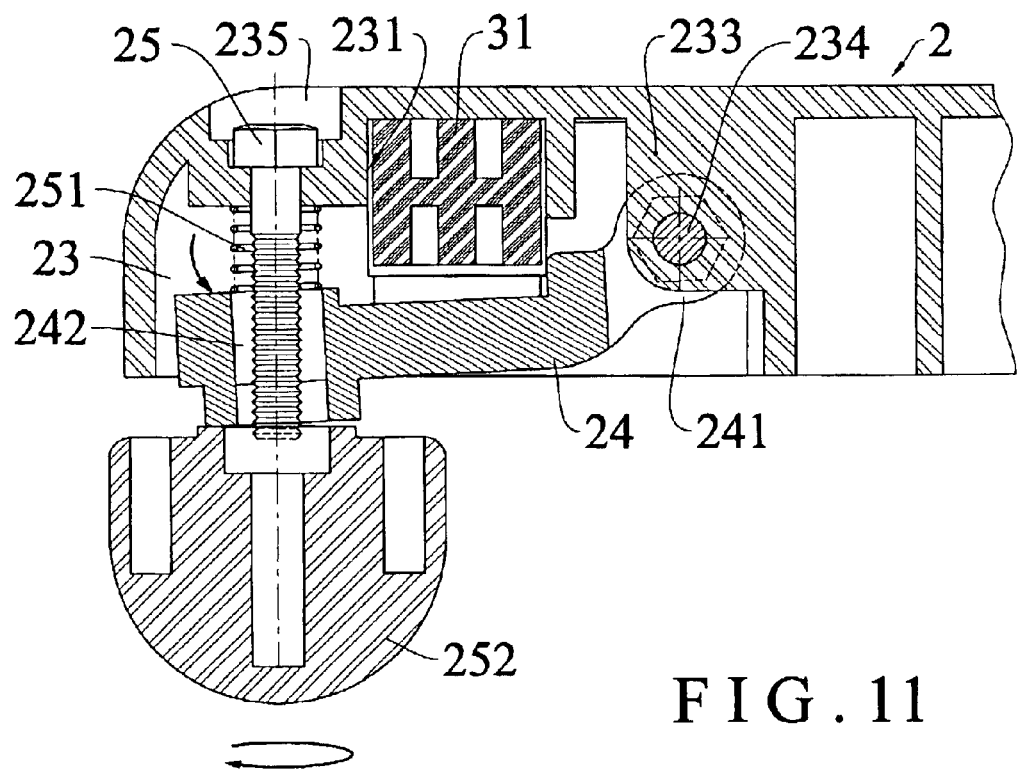
FIG. 11 is a side plan cross-sectional assembly view of the rear carrying board assembly of a stroller as shown in FIG. 4.
Figure 11A:
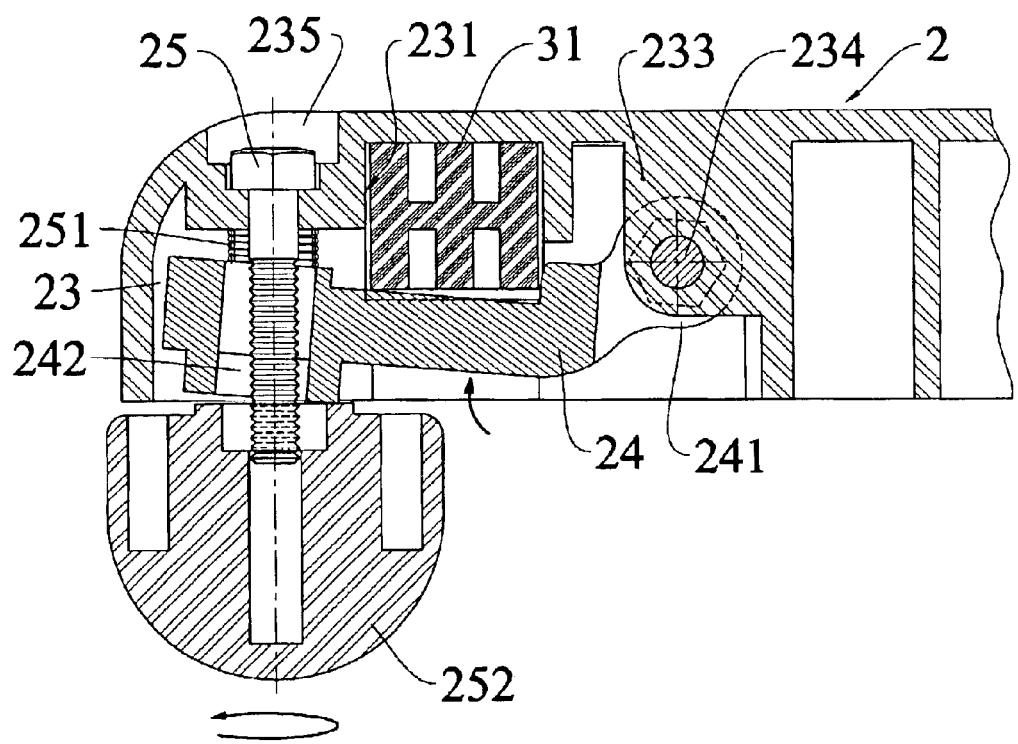
FIG. 11A is a schematic operational view of the rear carrying board assembly of a stroller as shown in FIG. 11.

In operation, referring to FIGS. 11 and 11A, the rotation knob 252 is rotated and unscrewed from the respective threaded rod 25, so that the clamping block 24 is pushed outward by the respective elastic member 251, thereby detaching the shaft 31 from the respective clamping block 24 as shown in FIG. 11. Thus, the shaft 31 of each of the two joint devices 3 is slidable in the slide channel 231 of the respective chamber 23, so that the two straddle bars 35 can be moved relative to the body 2 to adjust the distance between the two straddle bars 35 so as to fit the width of the rear frames 11 of the stroller 1. After adjustment, the rotation knob 252 is rotated and screwed on the respective threaded rod 25, thereby clamping the shaft 31 by the respective clamping block 24 as shown in FIG. 11A.

Figure 12A:
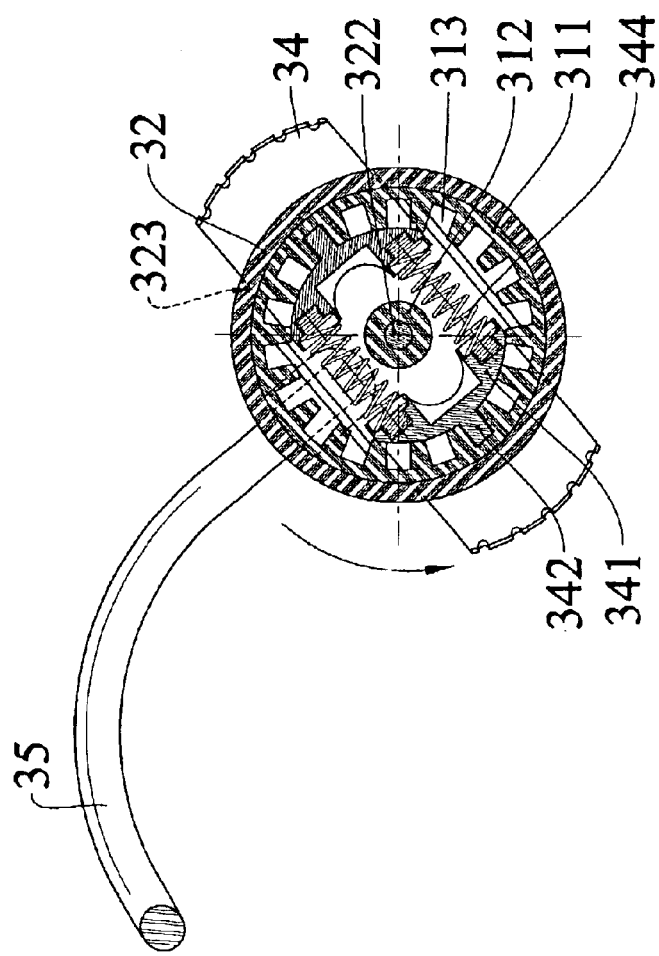
FIG. 12A is a schematic operational view of the rear carrying board assembly of a stroller as shown in FIG. 12.
Figure 12:
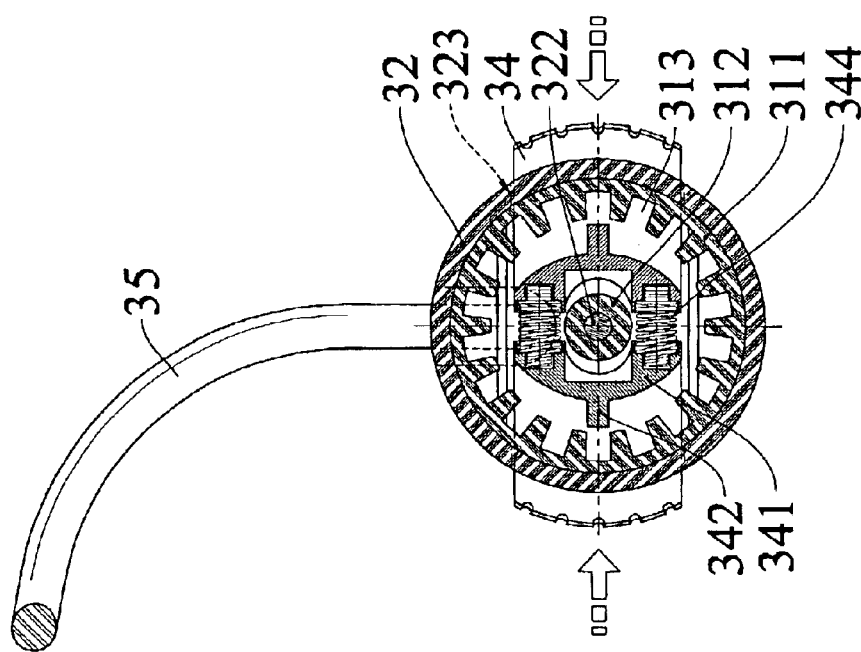
FIG. 12 is a side plan cross-sectional assembly view of the rear carrying board assembly of a stroller as shown in FIG. 6.

Referring to FIGS. 12 and 12A, the two press blocks 34 of each of the two joint devices 3 is pressed inward to disengage the locking tooth 342 from the engaging teeth 313 of the hub 311 as shown in FIG. 12. Thus, the cover 32 can be rotated on the hub 311, so that each of the two straddle bars 35 can be moved from the position as shown in FIG. 12 to the position as shown in FIG. 12A. Thus, the angle of each of the two straddle bars 35 can be adjusted so as to fit the inclined angle of the rear frames 11 of the stroller 1.

Figure 13:
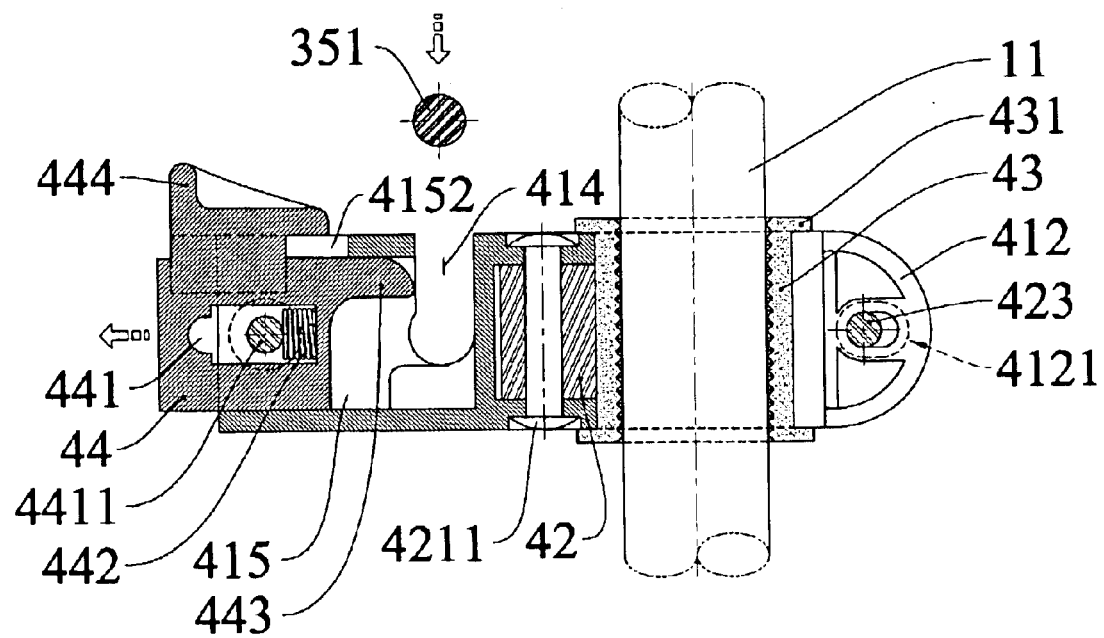
FIG. 13 is a side plan cross-sectional assembly view of the rear carrying board assembly of a stroller as shown in FIG. 7.
Figure 13A:
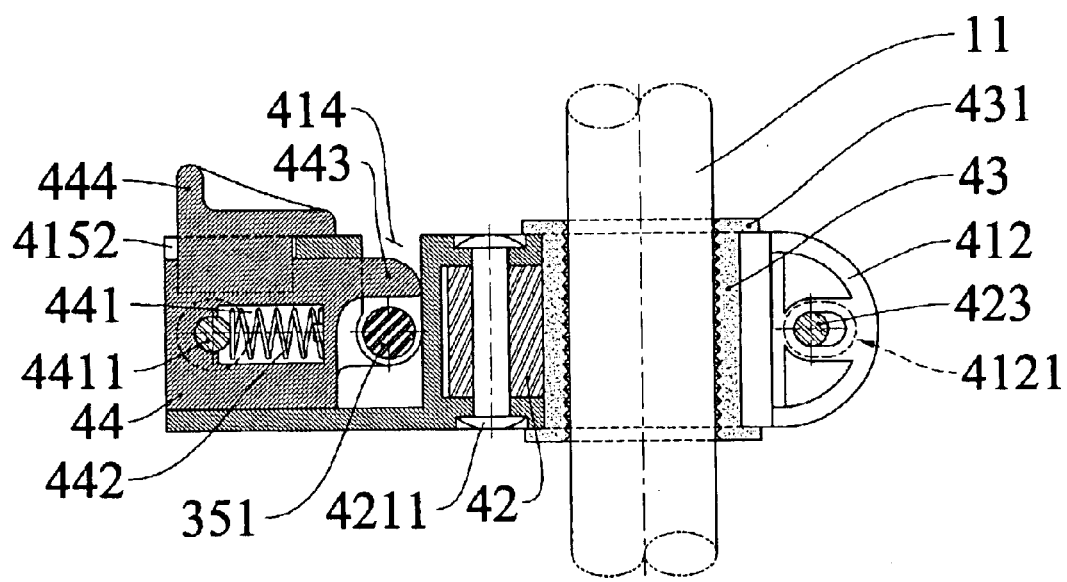
FIG. 13A is a schematic operational view of the rear carrying board assembly of a stroller as shown in FIG. 13.

Referring to FIGS. 13 and 13A, the mounting ring 43 of each of the two connecting devices 4 is mounted on the respective rear frame 11 of the stroller 1. Then, the movable clamping plate 42 is combined with the fixed clamping plate 411 to clamp the mounting ring 43 therebetween. Then, the push portion 444 of the slide 44 is pushed outward to detach the extension plate 443 of the slide 44 from the groove 414 of the connecting block 41 as shown in FIG. 13, so that the action section 351 of the straddle bar 35 can be inserted into the groove 414 of the connecting block 41. Then, the push portion 444 of the slide 44 is released, so that the slide 44 is returned by the restoring force of the elastic member 442 to return the extension plate 443 of the slide 44 to seal the groove 414 of the connecting block 41 as shown in FIG. 13A, so that the action section 351 of the straddle bar 35 is retained in the groove 414 of the connecting block 41, thereby assembling the whole rear carrying board assembly on the stroller 1 as shown in FIG. 1.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A rear carrying board assembly of a stroller, comprising a body, two joint devices, two connecting devices, and two shock-absorbing devices, wherein:

the body has a bottom having a first side having two ends each formed with a chamber, the chamber is formed with a slide channel, a plurality of pivot ears each located at a first side of the slide channel and each formed with a through hole, and a through bore located at a second side of the slide channel, the slide channel has a side wall formed with a rectangular hole, the chamber has a side wall formed with a circular hole aligning with the through hole of each of the pivot ears, the body includes two clamping blocks each pivotally mounted in the respective chamber and each having a first side formed with a plurality of pivot ears and a second side formed with a through hole, two threaded rods each extended through the through bore of the respective chamber and the through hole of the respective clamping block, two rotation knobs each screwed on the respective threaded rod and each rested on the respective clamping block, and two elastic members each mounted on the respective threaded rod and each urged between the respective chamber and the respective clamping block;

each of the two joint devices is mounted on the body, and includes a shaft, a cover, a washer, two press blocks, and a straddle bar;

the shaft is extended through the rectangular hole and is slidably mounted in the slide channel of the respective chamber, the shaft has a distal end provided with a circular hollow hub which has a center provided with an inner threaded rod and a periphery formed with a plurality of engaging teeth;

the cover is mounted on the hub of the shaft, the cover has a periphery formed with two opposite windows and provided with a hollow receiving portion;

each of the two press blocks is movably mounted in the respective window of the cover, and is provided with an arcuate block which has a first side formed with a locking tooth meshing with the engaging teeth of the hub of the shaft, and a second side having two ends each formed with a mounting hole for mounting an elastic member which is urged between the two press blocks;

the straddle bar has a first end inserted into the receiving portion of the cover and a second end formed with an action section;

each of the two connecting devices is mounted on the straddle bar of the respective joint device, and includes a connecting block, a movable clamping plate, a mounting ring, and a slide;

the connecting block has a first portion formed with an arcuate fixed clamping plate which has a first end formed with an opening and a second end formed with an extension formed with a through hole, the opening has a top wall and a bottom wall each formed with a through hole, the connecting block has a mediate portion formed with a groove for insertion of the action section of the straddle bar of the respective joint device, the connecting block has a second portion formed with a receiving chamber which has two side walls each formed with a pivot hole and a top wall formed with a cutout;

the movable clamping plate is pivotally mounted on the fixed clamping plate of the connecting block, and has a first end received in the opening of the connecting block and formed with a through hole aligning with the through hole of the opening of the connecting block, and a second end formed with an extension formed with a through hole;

the mounting ring is mounted between the movable clamping plate and the fixed clamping plate;

the slide is slidably mounted in the receiving chamber of the connecting block, the slide has an end formed with an extension plate, and has a top formed with a movable portion movably mounted in the cutout of the receiving chamber of the connecting block and an enlarged push portion located above the movable portion and movably mounted on the connecting block;

each of the two shock-absorbing devices is mounted on the bottom of the body, and includes a column, a wheel, an elastic member, and a protective sleeve.

2. The rear carrying board assembly of a stroller in accordance with claim 1, wherein the body has a top formed with an anti-skid portion.

3. The rear carrying board assembly of a stroller in accordance with claim 1, wherein the bottom of the body is formed with a plurality of reinforcing ribs.

4. The rear carrying board assembly of a stroller in accordance with claim 1, wherein the body further includes two pivot rods each extended through the circular hole of a respective chamber, each of the pivot ears of a respective clamping block and the through hole of each of the pivot ears of the respective chamber.

5. The rear carrying board assembly of a stroller in accordance with claim 1, wherein the cover has a center formed with a central hole for passage of a threaded rod which is extended through the washer and is screwed into the inner threaded rod, thereby securing the cover on the hub of the shaft.

6. The rear carrying board assembly of a stroller in accordance with claim 1, further comprising a pivot rod extended through the through hole of the opening of the connecting block and the through hole of the movable clamping plate.

7. The rear carrying board assembly of a stroller in accordance with claim 1, wherein the receiving chamber communicates with the groove.

8. The rear carrying board assembly of a stroller in accordance with claim 1, further comprising a threaded rod extended through the through hole of the extension of the fixed clamping plate and the through hole of the extension of the movable clamping plate, and screwed with a nut, thereby securing the movable clamping plate on the fixed clamping plate.

9. The rear carrying board assembly of a stroller in accordance with claim 1, wherein the mounting ring has a wall formed with a slit.

10. The rear carrying board assembly of a stroller in accordance with claim 1, wherein the mounting ring has two ends each formed with an annular lip.

11. The rear carrying board assembly of a stroller in accordance with claim 1, wherein the mounting ring has a different inner diameter to fit the diameter of the rear frame of the stroller.

12. The rear carrying board assembly of a stroller in accordance with claim 1, wherein the slide has a side formed with an oblong guide slot, a guide rod is extended through the pivot hole of the receiving chamber of the connecting block and the guide slot of the slide, so that the slide is movably mounted on the guide rod, and an elastic member is mounted in the guide slot of the slide and is urged between the guide rod and a front wall of the guide slot of the slide.

13. The rear carrying board assembly of a stroller in accordance with claim 1, wherein the bottom of the body has a second side having two ends each formed with a socket formed with two opposite arcuate slots, the socket has a periphery provided with two pairs of protruding ears each formed with a through hole, the bottom of the body has a side wall formed with two circular holes aligning with the through hole of the respective protruding ears.

14. The rear carrying board assembly of a stroller in accordance with claim 13, wherein the column is movably mounted in the respective socket of the body, and has an upper portion formed with two slide grooves and a lower portion formed with an annular resting flange.

15. The rear carrying board assembly of a stroller in accordance with claim 14, wherein each of the two shock-absorbing devices further includes two locking bolts each extended through the respective circular hole of the body, the through hole of the respective protruding ears, the respective arcuate slot of the socket and the respective slide groove of the column, and two locking nuts each screwed on the respective locking bolt.

16. The rear carrying board assembly of a stroller in accordance with claim 14, wherein the elastic member of each of the two shock-absorbing devices is mounted on the column and urged between a bottom of the socket and the resting flange of the column.

17. The rear carrying board assembly of a stroller in accordance with claim 16, wherein the protective sleeve is mounted on the socket to encompass the column and the elastic member.

18. The rear carrying board assembly of a stroller in accordance with claim 1, wherein the column has an inner wall formed with an inner ring, and the wheel has a top rotatably mounted on the column and provided with two elastic hooks hooked on the inner ring of the column.

* * * * *